United States Patent [19]
Taeffner et al.

[11] 3,773,598
[45] Nov. 20, 1973

[54] APPARATUS FOR SLITTING AND ADHESIVELY JOINING PARALLEL WEBS OF MATERIAL

[75] Inventors: Klaus Taeffner, Cologne; Hermann Luhrig, Leverkusen, both of Germany

[73] Assignee: Agfa-Gevaert Aktiengesellschaft, Leverkusen, Germany

[22] Filed: Sept. 28, 1971

[21] Appl. No.: 184,377

[30] Foreign Application Priority Data
Oct. 8, 1970 Germany.................. P 20 49 427.3

[52] U.S. Cl............... 156/505, 156/507, 156/511, 156/517, 156/545, 156/159, 156/259, 156/266
[51] Int. Cl..... B31f 5/00, B32b 31/08, G03d 15/04
[58] Field of Search.................... 156/505, 507, 511, 156/517, 159, 259, 304, 502, 544–545, 266, 512

[56] References Cited
UNITED STATES PATENTS
3,577,297   5/1971   Howard ...................... 156/512 X
1,217,252   2/1917   Williamson ..................... 156/505
2,726,975   12/1955  Hoag................................. 156/259

Primary Examiner—Philip Dier
Attorney—Connolly and Hutz

[57] ABSTRACT

An apparatus for fabricating and adhesively uniting parallel webs or strips of material by an edge-to-edge adhesive joint, consisting of a cutting device for providing clean cut web edges, and a joining device. The joining device consists of a lower part beneath the web and an upper part above the web, each part comprising a roll of adhesive tape and a pressure roller, both rollers being in contact along a surface line in the plane of the web, the upper part and lower part being rigidly connected to one another by a narrow bar which extends obliquely of the plane of the web and which passes through the cut in the web which is produced by the cutting device.

8 Claims, 3 Drawing Figures

Patented Nov. 20, 1973

APPARATUS FOR SLITTING AND ADHESIVELY JOINING PARALLEL WEBS OF MATERIAL

The present invention relates to an apparatus for fabricating and adhesively uniting webs or strips of material by an edge-to-edge adhesive joint. The apparatus consists essentially of two suction ducts for holding the webs to be united, a cutting device displaceable on the suction ducts for producing clean cut edges to the webs, and a joining device likewise displaceable on the suction ducts.

Various apparatus are known with which two webs can be joined edge-to-edge. With such apparatus, the joining operation can only be carried out on either the front or the back of the webs to be united. An apparatus is known with which an edge-to-edge adhesive union can be produced on the front or the back of the webs to be connected (British Pat. No. 1,122,156). An apparatus is also known in which the joining operation can be carried out on the front, the back, or both sides of the webs (U.S. Pat. No. 2,745,464), but the joining of both sides of the web cannot be achieved unless both sides of the webs are accessible to the operator in the region of the joining apparatus.

The object of the invention is to develop a joining apparatus with which the joining operation can be carried out in one working step on the front, the back or on both sides of the webs to be united.

According to the present invention, there is provided an apparatus for fabricating and adhesively uniting webs or strips of material by an edge-to-edge adhesive joint, comprising two suction ducts for holding the webs which are to be united, a cutting device displaceable on the suction ducts for producing clean cut web edges, and a joining device likewise displaceable on the suction ducts, the joining device comprising a lower part beneath the duct surfaces and an upper part above the duct surfaces, each part supporting a roll of adhesive tape and a pressure roller, the rollers being in contact along a line in the plane of the duct surfaces, the upper and lower parts being rigidly connected to one another by a narrow bar which extends obliquely with respect to the plane of the duct surfaces and which is adapted to pass through the gap between the webs which are to be united. The pressure roller in the upper part is preferably connected rigidly to a pair of wheels of the same diameter as itself which run on the web, the roller being set in rotation by displacement of the joining apparatus.

For producing good edge-to-edge adhesive joints, clean cut edges are necessary. The joining apparatus is for this reason equipped with a device for cutting clean cut edges, which is displaceable on the suction ducts.

According to the present invention, there is further provided that the cutting device comprises a pair of cooperating rotating circular knives, one knife being arranged in an upper part of the cutting device above the duct surfaces and the other in the lower part beneath the duct surfaces, the upper and lower parts being rigidly connected to one another by a narrow bar which extends obliquely with respect to the plane of the web, said bar passing through the cut in a web which is produced by the circular knives.

The circular knife in the upper part of the cutting device is advantageously connected rigidly to a pair of wheels which run on the web, the knife being rotated by displacement of the cutting device.

The construction as described makes possible a compact design of the joining and cutting apparatus. Furthermore, it has been found that it is possible with this apparatus to produce very clean adhesive unions, the adhesive tape being applied on the front, the back, or simultaneously on both sides of the webs to be united.

The joining apparatus according to the invention is hereinafter more fully described by reference to the accompanying drawings, wherein.

Figure 1:
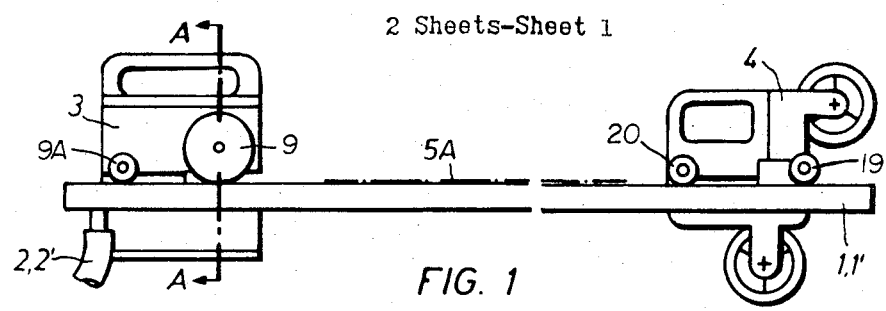
FIG. 1 shows a complete joining apparatus according to the invention.

FIG. 1 shows an elevation of the complete joining apparatus. An uncut web or strip 5A is shown supported by suction ducts 1,1' (1' cannot be seen) which are provided with vacuum connections 2,2' (2' cannot be seen). A cutting device 3 is shown on the left and a joining device 4 on the right.

Figure 2:
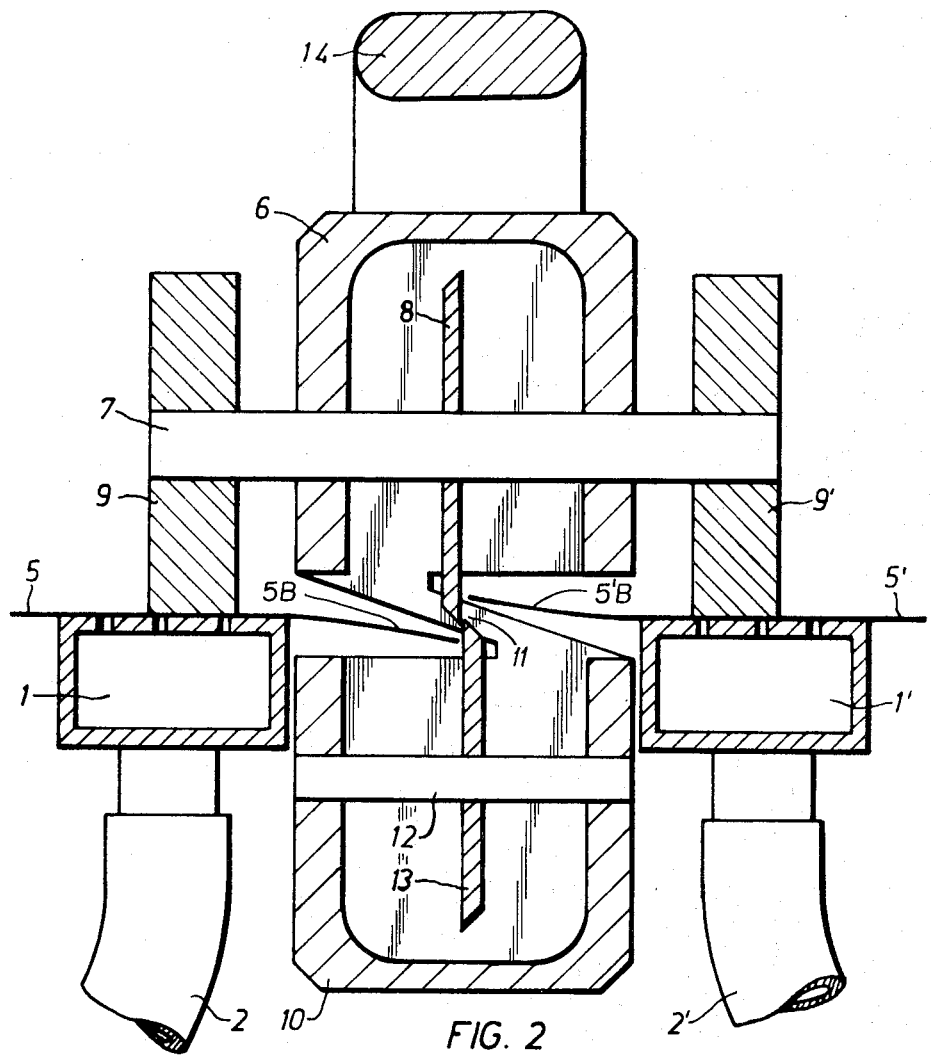
FIG. 2 is a cross-section through a cutting device.

FIG. 2 shows the section AA through the cutting device 3, which is carried by the suction ducts 1 and 1' having the vacuum connections 2 and 2'. A shaft 7 is rotatably mounted in an upper part 6 of the cutting device. An upper knife 8 and a pair of wheels 9,9' are connected rigidly to the shaft 7. The top knife shaft is driven by the wheels 9,9' during movement of the device over the suction ducts on front wheels 9,9' and smaller rear wheels 9A, 9'A. In this way, a satisfactory cut is produced. A shaft 12 which carries a bottom knife 13 is rotatably mounted in a lower part 10 which is connected to the upper part 6 by a bar 11 extending at an acute angle to the plane of the web. The cutting device is moved along above the suction ducts by means of pressure on the handle 14.

It is also seen (in an exaggerated manner) how the ends 5B and 5'B of the webs 5,5' (cut from web 5A) which are to be connected are bent slightly downwards and upwards, respectively, by the bar 11 which passes between them.

Figure 3:
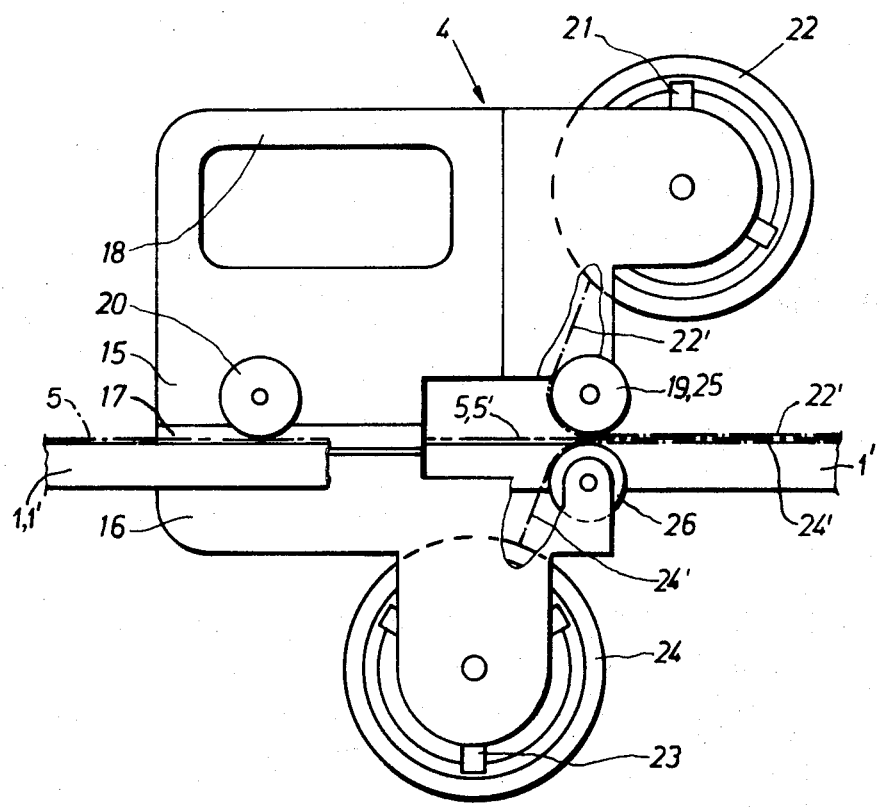
FIG. 3 is a side elevation of a joining device.

FIG. 3 shows a side elevation of the joining device 4. It consists of an upper part 15 and a lower part 16 which, as with the similar parts of the cutting device, are connected rigidly to one another by a bar 17 (similar to bar 11) extending at an acute angle to the plane of the web. The joining device 4 is pushed on the pairs of wheels 19 and 20 above the suction ducts 1,1' by means of pressure on the hand grip 18. The joining device also consists of an upper star-shaped supply member 21 which carries a roll of adhesive tape 22 and a lower star-shaped supply member 23 which carries a roll of adhesive tape 24. Adhesive tapes 22' and 24' are guided from the rolls 22 and 24 over rotatably mounted pressure rollers 25 (covered by the front wheel 19) and 26, and then between the two of them. The pair of wheels 19 is connected rigidly to the upper pressure rollers 25 and drives the latter during movement of the joining device. As a result, the adhesive tapes 22' and 24' are withdrawn from the tape rolls 22 and 24. Since a length of adhesive tape corresponding to the distance covered by the joining device has to be drawn off, the wheel pair 19 and the pressure roller 25 have the same diameter.

During operation of the joining apparatus, the edges of unwound web 5A are laid above the suction ducts and suction is applied, the cutting device 3 with the "knives in front" is moved from its initial position on the left (see FIG. 1) over the suction ducts towards the right (in this movement, the web 5 is severed from the web 5' in the middle between the suction ducts) and is immediately moved back again into its initial position on the left. The residual piece of the web which is cut off is removed. The return movement to the initial position is necessary, since the cutting device can only cut with the "knives in front"; it is only then that there is the necessary cut in the web through which the bar 11 can pass. The webs 5,5' which are to be connected now lie in an abutting position, i.e., without overlap, but also without any spacing from one another.

The joining device 4 is now pushed from its initial position on the right (see FIG. 1) with the "bar in front" along and above the suction ducts towards the left. In this movement, the webs 5,5' which are to be joined together run between the adhesive tapes 22', 24' travelling over the pressure rollers 25,26 and are joined to one another on both sides. The adhesive tape projecting at the edges of the web is cut off by hand. Since there must also be a cut in the web for the joining device, through which cut the bar 17 can pass, the cutting device can only operate in the "bar in front" position. Consequently, the joining device, after the tape applying operation, is lifted from the suction ducts and set down again in its initial position on the right end of the said ducts. The tape applying operation is thus completed and the joining apparatus is again ready for the next tape applying operation.

As initially mentioned, the joining apparatus according to the invention can also be used for producing an adhesive connection on one side only of the webs to be united. For this purpose, either the upper adhesive tape for the top taping operation or the lower adhesive tape for the bottom taping operation is omitted.

What we claim is:

1. An apparatus for fabricating and adhesively uniting parallel webs of material obtained from an elongated web of material from which the parallel webs are slit, by an edge-to-edge adhesive joint, comprising two parallel spaced suction ducts for holding the elongated web and the parallel webs which are to be united, a cutting device displaceable on the suction ducts and extending between them for slitting the elongated web and producing from it the parallel webs having clean cut web edges at a gap, and a joining device likewise displaceable on the suction ducts and extending between them, the joining device comprising a lower part beneath the duct surfaces and an upper part above the duct surfaces, each part supporting a roll of adhesive tape and a pressure roller, the rollers being in contact along a line in the plane of the duct surfaces, the upper and lower parts being rigidly connected to one another by a narrow bar which extends obliquely with respect to the plane of the duct surfaces and which is adapted to pass through the plane of the duct surfaces and the gap between the webs which are to be united whereby the tops and bottoms of the webs are joined by the rolls of adhesive tape and the contact of the upper and lower pressure rollers.

2. An apparatus according to claim 1, wherein the pressure roller in the upper part of the joining device is connected to rotate together with a pair of wheels substantially of the same diameter as itself and which run on the webs, the roller being set in rotation by displacement of the joining device on said pair of wheels.

3. An apparatus according to claim 1, wherein the cutting device comprises a pair of cooperating rotating circular knives, one knife being arranged in an upper part of the cutting device above the duct surfaces and the other in the lower part beneath the duct surfaces, the upper and lower parts being rigidly connected to one another by a narrow bar which extends obliquely with respect to and through the plane of the web, the bar passing through the cut in a web which is produced by the circular knives.

4. An apparatus according to claim 3, wherein the circular knife in the upper part of the cutting device is connected rigidly to a pair of wheels which run on the web, the knife being rotated by displacement of the cutting device.

5. An apparatus for performing simultaneous slitting and joining operations on opposite sides of an elongated web material which is cut into parallel strips with a gap between the parallel strips comprising a pair of parallel spaced ducts having perforated flat upper surfaces, an air exhausting means connected to the ducts for creating a partial vacuum within them whereby the web is firmly maintained in position on and between them, a mobile carriage mounted across the ducts for movement along their length, mobile means mounting the carriage on the ducts for longitudinal movement along them, upper and lower slitting and joining operating sections on the carriage for performing the slitting and joining operations on the portion of the web disposed between the ducts, the joining operating sections each comprise a supply of adhesive tape and pressure means for applying it to the parallel strips at the gap between them, and an inclined narrow connecting bar suspending the lower operating section from the upper and passing through the gap between the parallel strips whereby the tops and bottoms of the strips are joined by the adhesive tape and the contact of the upper and lower pressure means.

6. An apparatus according to claim 5 wherein the operating sections comprise rotating cutting discs for slitting the web in front of the narrow connecting bar.

7. An apparatus according to claim 5 wherein the operating sections each comprise adhesive tape applicators for adhesively joining the slit ends of the web together in back of the narrow connecting bar.

8. An apparatus according to claim 7 wherein the adhesive tape applicators comprise supply reels and pressure rollers disposed in line with each other on opposite sides of the slit in the web.

* * * * *